United States Patent
Sueda et al.

(10) Patent No.: US 9,537,443 B2
(45) Date of Patent: Jan. 3, 2017

(54) REINFORCING FRAME AND SOLAR BATTERY MODULE

(71) Applicant: Mitsubishi Electric Corporation, Chiyoda-ku (JP)

(72) Inventors: Taisuke Sueda, Tokyo (JP); Daisuke Echizenya, Tokyo (JP); Hiroo Sakamoto, Tokyo (JP); Atsushi Michimori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/386,551

(22) PCT Filed: Apr. 22, 2013

(86) PCT No.: PCT/JP2013/061775
§ 371 (c)(1),
(2) Date: Sep. 19, 2014

(87) PCT Pub. No.: WO2013/161757
PCT Pub. Date: Oct. 31, 2013

(65) Prior Publication Data
US 2015/0068589 A1     Mar. 12, 2015

(30) Foreign Application Priority Data
Apr. 23, 2012 (JP) .................... 2012-098086

(51) Int. Cl.
*H02S 30/10* (2014.01)
*H02S 20/00* (2014.01)
(Continued)

(52) U.S. Cl.
CPC .............. *H02S 30/10* (2014.12); *F24J 2/5203* (2013.01); *F24J 2/5233* (2013.01); *H02S 20/00* (2013.01);
(Continued)

(58) Field of Classification Search
CPC .......... Y02E 10/47; Y02E 10/50; Y02B 10/12; H02S 20/00; H02S 30/10; H01L 311/0422; F24J 2/5245; F24J 2/5203; F24J 2/5233; F24J 2002/4676; F24J 2002/5215
(Continued)

(56) References Cited

U.S. PATENT DOCUMENTS 7,037,568 B1 *  5/2006  Rogers ................ B29C 65/5057
                                                              244/131
2010/0132767 A1   6/2010  Miyamoto et al.
(Continued)

FOREIGN PATENT DOCUMENTS

EP    2 157 619 A1    2/2010
EP    2 312 647 A1    4/2011
(Continued)

OTHER PUBLICATIONS

Japanese Office Action dated Jan. 27, 2015 issued in corresponding Japanese Patent Appln. No. 2014-512554, with English translation (6 pages).
(Continued)

*Primary Examiner* — Joshua J Michener
*Assistant Examiner* — Theodore Adamos
(74) *Attorney, Agent, or Firm* — Buchanan Ingersoll & Rooney PC

(57) ABSTRACT

To obtain a reinforcing frame capable of securing sufficient reinforcing strength and adhesive strength while suppressing a manufacturing cost by omitting a rim-like frame. A reinforcing frame is adhered to a rear surface, which is a non-light receiving surface of a solar battery panel, and includes a cylindrical portion that has a cylindrical shape along a longitudinal direction of the reinforcing frame and on which an adhesive surface for adhering to the solar
(Continued)

battery panel is formed, and protruding portions that protrude from end portions along a longitudinal direction of the adhesive surface and that are substantially parallel to the adhesive surface.

6 Claims, 7 Drawing Sheets

(51) Int. Cl.
    *H01L 31/042* (2014.01)
    *F24J 2/52* (2006.01)
    *F24J 2/46* (2006.01)

(52) U.S. Cl.
    CPC . *F24J 2002/4676* (2013.01); *F24J 2002/5215* (2013.01); *Y02E 10/47* (2013.01); *Y02E 10/50* (2013.01)

(58) Field of Classification Search
    USPC .......................... 52/27, 173.1, 173.3, 800.1, 800.11,52/801.1; 136/243–245, 251
    See application file for complete search history.

(56) References Cited

U.S. PATENT DOCUMENTS

| | | | |
|---|---|---|---|
| 2011/0126888 A1* | 6/2011 | Naitoh | H01L 31/048 136/251 |
| 2011/0174353 A1* | 7/2011 | Urban et al. | 136/244 |
| 2011/0226335 A1 | 9/2011 | Naitoh et al. | |
| 2011/0232728 A1 | 9/2011 | Mun | |
| 2012/0037214 A1 | 2/2012 | Sagayama | |
| 2012/0073219 A1* | 3/2012 | Zuritis | 52/173.3 |
| 2012/0279560 A1* | 11/2012 | Sumida et al. | 136/251 |
| 2012/0312357 A1 | 12/2012 | Sagayama | |

FOREIGN PATENT DOCUMENTS

| | | |
|---|---|---|
| JP | 7-28023 U | 5/1995 |
| JP | 9-148612 A | 6/1997 |
| JP | 2006-269609 A | 10/2006 |
| JP | 2009-135304 A | 6/2009 |
| JP | 2010-206229 A | 9/2010 |
| JP | 2011-103624 A | 5/2011 |
| JP | 2011-185030 A | 9/2011 |
| JP | 2011-219569 A | 11/2011 |
| JP | 2012-119943 A | 6/2012 |
| WO | WO 2008/139609 A1 | 11/2008 |
| WO | WO 2010/013691 A1 | 2/2010 |
| WO | WO 2010013691 A1 * 2/2010 .......... H01L 31/048 |
| WO | WO 2010/061878 A1 | 6/2010 |
| WO | WO 2010/117018 A1 | 10/2010 |
| WO | 2011090160 A1 | 7/2011 |
| WO | WO 2011090160 A1 * | 7/2011 |
| WO | WO 2012/105494 A1 | 8/2012 |

OTHER PUBLICATIONS

International Search Report (PCT/ISA/210) mailed on May 28, 2013, by the Japanese Patent Office as the International Searching Authority for International Application No. PCT/JP2013/061775.

Written Opinion (PCT/ISA/237) mailed on May 28, 2013, by the Japanese Patent Office as the International Searching Authority for International Application No. PCT/JP2013/061775.

Japanese Office Action issued Jul. 7, 2015, by the Japanese Patent Office in corresponding Japanese Patent Application No. 2014-512554 and a English translation thereof. (6 pgs).

First Office Action issued Dec. 2, 2015 by the Chinese Office Action in corresponding Chinese Patent Application No. 201380021162.7, and an English translation of the text portion thereof (13 pages).

* cited by examiner

REINFORCING FRAME AND SOLAR BATTERY MODULE

FIELD

The present invention relates to a reinforcing frame adhered to a rear surface of a solar battery panel and a solar battery module to which a reinforcing frame is adhered.

BACKGROUND

A conventional solar battery module has a solar battery panel in which power generation elements referred to as "cells" are arranged on a translucent panel such as glass. An outer edge portion of the solar battery panel is supported by a rectangular rim-like frame that surrounds the entire circumference. Furthermore, the solar battery panel is fixed via the rim-like frame on a solar battery rack installed on the ground or a roof. Further, a reinforcing frame for supporting a rear surface of the solar battery panel at the time when the solar battery panel is warped is provided inside the rim-like frame (see, for example, Patent Literature 1).

In recent years, a method for configuring a solar battery module without using a rim-like frame has been studied. A solar battery panel not using a rim-like frame has an advantage of excellent productivity and the like because a process of engaging the solar battery panel with the rim-like frame can be omitted. For example, a solar battery panel can be manufactured by applying silicone resin or the like as a contact stopper having excellent heat resistance to an exposed glass end portion of the solar battery panel (see, for example, Patent Literature 2).

Furthermore, there is proposed a solar battery module and the like in which a relatively heavy reinforcing plate such as a glass plate or a metal plate on a rear surface of a solar battery panel is omitted, an outer edge portion of the solar battery panel having flexibility is surrounded by a rim-like frame, and a rib both ends of which are engaged with the rim-like frame is provided as a reinforcing material on the rear surface of the solar battery panel (see, for example, Patent Literature 3).

Further, there is proposed, as a module in which a solar battery panel is fixed on a solar battery rack without using a rim-like frame, a solar battery module in which a tension bar being a reinforcing frame is fixed on a rear surface of the solar battery panel, and both end portions of the tension bar are spanned across bars of the solar battery rack and are supported (for example, see Patent Literature 4).

CITATION LIST

Patent Literatures

Patent Literature 1: Japanese Patent Application Laid-open No. 2010-206229
Patent Literature 2: Japanese Patent Application Laid-open No. 2011-219569
Patent Literature 3: Japanese Patent Application Laid-open No. 2006-269609
Patent Literature 4: Japanese Patent Application Laid-open No. 2011-185030

SUMMARY

Technical Problem

In the conventional solar battery module disclosed in Patent Literature 1, because the process of engaging the rim-like frame with the solar battery panel is required, the productivity is low and the cost is high. Furthermore, as measures against deflection in the solar battery panel, the reinforcing frame is fixed on the rim-like frame.

In Patent Literature 2, the method for configuring a solar battery panel without using the rim-like frame is studied; however, a method for fixing the solar battery panel on the solar battery rack is not studied. Further, in Patent Literature 3, as a measure against bendability in a gap portion between photovoltaic devices, which is a problem peculiar to a solar battery panel that has flexibility and that does not use a heavy reinforcing plate such as a glass plate or a metal plate, the rib is provided on the rear surface of the solar battery panel as a reinforcing material. However, both ends of the rib are required to be fixed on the frame that surrounds the solar battery panel, thus requiring use of the rim-like frame, leading to low productivity and high cost.

Under such circumstances, as a method for fixing the solar battery panel on the solar battery rack without surrounding the outer edge portion of the solar battery panel by the rim-like frame, a method for adhering a reinforcing member as the measures against deflection of the solar battery panel, for example, to the rear surface of the solar battery panel via an adhesive member such as an adhesive or a double-faced tape, and directly fixing the reinforcing member (that is, without using the rim-like frame) on the solar battery rack is considered.

However, the solar battery panel is required to withstand a load such as wind pressure and accumulated snow, which is assumed at the time of use, and high rigidity is required for the reinforcing member. Meanwhile, the solar battery panel and the reinforcing member are adhered with an adhesive member. Therefore, as measures against adhesive separation, stress generated in a junction between the reinforcing member and the rear surface of the solar battery panel is required to be reduced as much as possible.

In the solar battery module disclosed in Patent Literature 4, the tension bar adhered to the rear surface of the solar battery panel is directly fixed on the solar battery rack without using the rim-like frame. However, a cross sectional shape of the tension bar is a U-shape, with which shape, the rigidity of the reinforcing member is difficult to secure. Further, reduction of stress generated in the junction between the tension bar and the rear surface of the solar battery panel is not considered at all.

The present invention has been achieved in view of the above problems, and an object of the present invention is to provide a reinforcing frame capable of securing sufficient reinforcing strength and adhesive strength while suppressing the manufacturing cost by omitting a rim-like frame.

Solution to Problem

In order to solve the aforementioned problems, a reinforcing frame adhered to a rear surface, the rear surface being a non-light receiving surface of a solar battery panel, is constructed in such a manner as to include: a cylindrical portion that has a cylindrical shape along a longitudinal direction of the reinforcing frame and on which an adhesive surface for adhering to the solar battery panel is formed; and protruding portions that protrude from end portions along a longitudinal direction of the adhesive surface and that are substantially parallel to the adhesive surface.

Advantageous Effects of Invention

According to the present invention, by providing protruding portions, the rigidity of a reinforcing member in an end portion of an adhesive surface can be reduced. As a result, the concentration of stress generated in the end portion of the adhesive surface can be relieved and an initiation stress generated in the adhesive surface can be reduced. Furthermore, a rim-like frame can be omitted and the manufacturing cost can be suppressed.

DESCRIPTION OF EMBODIMENTS

Exemplary embodiments of a reinforcing frame and a solar battery module according to the present invention will be explained below in detail with reference to the accompanying drawings. The present invention is not limited to the embodiments.

First Embodiment

Figure 1:
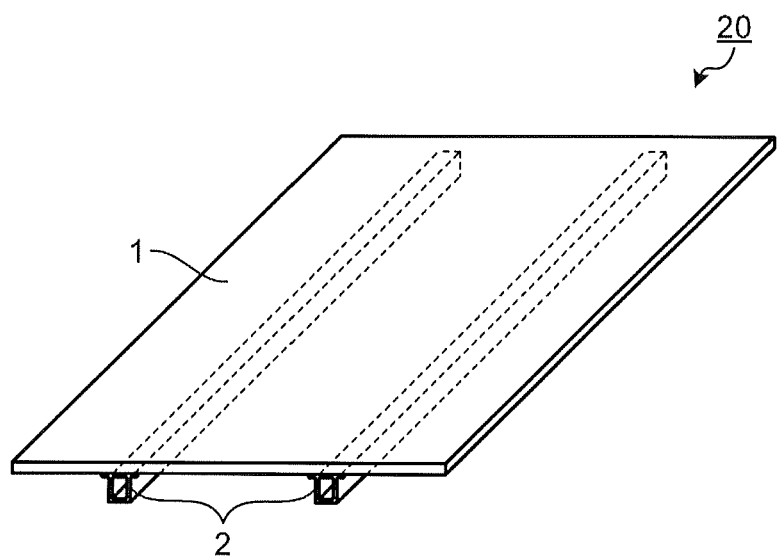
FIG. 1 is a perspective view of a solar battery module according to a first embodiment of the present invention.

FIG. 1 is a perspective view of a solar battery module according to a first embodiment of the present invention.

Figure 2:
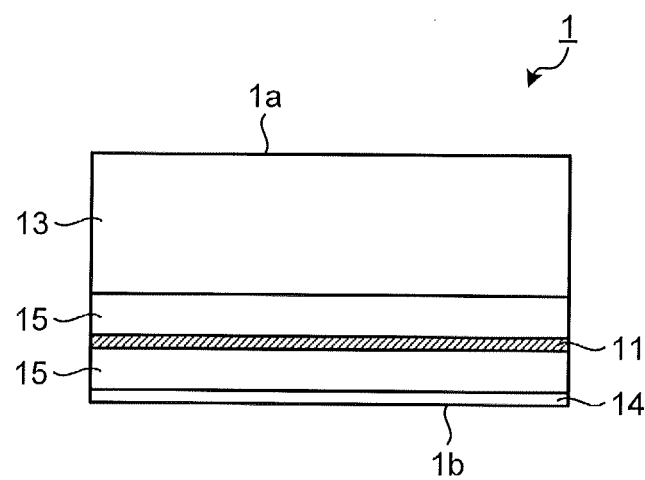
FIG. 2 is a schematic view for explaining a cross sectional structure of a solar battery panel.

FIG. 2 is a schematic view for explaining a cross sectional structure of a solar battery panel. A solar battery module 20 includes a solar battery panel 1 and a reinforcing rail (reinforcing frame) 2. As shown in FIG. 2, the solar battery panel 1 has a structure in which both surfaces of a solar battery cell 11 are sealed with a sealing material 15 such as EVA, a translucent panel 13 such as glass is provided on the side of a light receiving surface 1a, and a back film 14 is provided on the side of a rear surface 1b being a non-light receiving surface.

Figure 3:
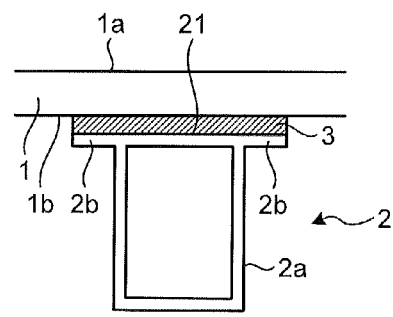
FIG. 3 is a partially enlarged view of an adhesion portion between a solar battery panel and a reinforcing rail.

FIG. 3 is a partially enlarged view of an adhesion portion between the solar battery panel 1 and the reinforcing rail 2. As shown in FIG. 3, the reinforcing rail 2 is adhered to the rear surface 1b of the solar battery panel 1 via an adhesive member 3.

Figure 4:
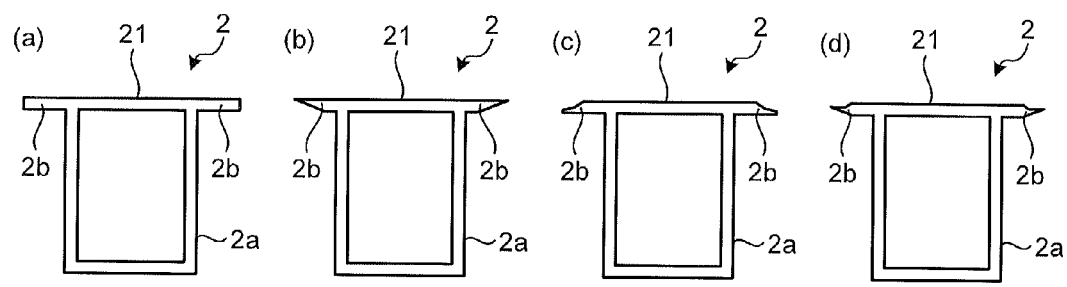
FIG. 4 are cross sectional views as viewed along a longitudinal direction of a reinforcing rail.

FIG. 4 are cross sectional views as viewed along a longitudinal direction of the reinforcing rail 2. The reinforcing rail 2 includes a cylindrical portion 2a having a cylindrical shape along the longitudinal direction. In the cylindrical portion 2a, a cross sectional shape as viewed along the longitudinal direction is a substantially rectangular shape, and one side thereof serves as an adhesive surface 21 adhered to the solar battery panel. The reinforcing rail 2 has the same cross sectional shape along the longitudinal direction, and therefore can be manufactured by extrusion molding. By using oxidation-resistant aluminum for the reinforcing rail 2, the reinforcing rail 2 can be made resistant to rust.

By providing a closed section like the cylindrical portion 2a on the reinforcing rail 2, torsional rigidity can be increased. In an aluminum extrusion process, in a case of having a closed section like the cylindrical portion 2a, from a manufacturing aspect, the reinforcing rail further has an advantage of stable manufacturing as compared to the case of having no closed section. Furthermore, in the case of having the closed section like the cylindrical portion 2a, a thinner wall can be manufactured as compared to the extrusion process having no closed section, and the material cost can be reduced.

On the other hand, by configuring the cylindrical portion 2a, when a load to separate the solar battery panel 1 from the reinforcing rail 2 is generated by a wind pressure toward the solar battery module, large stress is generated in an adhesion portion in which the solar battery panel 1 and the reinforcing rail 2 are adhered to each other. The stress particularly concentrates in an end portion of the adhesive surface 21 and a maximum stress is easily generated in the end portion of the adhesive surface 21.

In this connection, the reinforcing rail 2 has plate-like protruding portions 2b that protrude from the end portions along the longitudinal direction of the adhesive surface 21 substantially parallel to the adhesive surface 21. With this configuration, the rigidity of the reinforcing rail 2 in the end portion of the adhesive surface 21 can be reduced. As a result, the concentration of the stress generated in the end portion of the adhesive surface 21 can be relieved. Accordingly, by forming the protruding portions 2b, a maximum initiation stress generated on the adhesive surface 21 can be reduced.

In FIGS. 4(a) to 4(d), variations of the protruding portions 2b are shown. As shown in FIG. 4(a), the protruding portions 2b may be configured so as to have a constant thickness. As shown in FIGS. 4(b) to 4(d), the protruding portions 2b may be respectively configured so as to have a smaller thickness as separating from the cylindrical portion 2a.

In FIG. 4(b), as the protruding portions 2b become more separated from the cylindrical portion 2a, lower surface sides of the protruding portions 2b become closer to the rear surface 1b of the solar battery panel 1. In FIG. 4(c), as the protruding portions 2b become more separated from the cylindrical portion 2a, upper surface sides of the protruding portions 2b become more separated from the rear surface 1b of the solar battery panel 1. In FIG. 4(d), as the protruding portions 2b become more separated from the cylindrical portion 2a, the lower surface sides of the protruding portions 2b become closer to the rear surface 1b of the solar battery panel 1 and the upper surface sides of the protruding portions 2b become more separated from the rear surface 1b of the solar battery panel 1.

When the protruding portions 2b are formed such that the thickness becomes smaller as the protrusion portions 2b become more separated from the cylindrical portion 2a, the rigidity in the end portion of the adhesive surface 21 can be further reduced, and the concentration of the stress in the end portion of the adhesive surface 21 can be further reduced.

According to the examples shown in FIGS. 4(c) and 4(d), a thickness of the adhesive member 3 can be increased and the concentration of the stress can be further relieved. For example, it is preferable from the viewpoint of the strength and the material cost that an adhesion width is approximately from 20 to 60 millimeters and an adhesion thickness is approximately from 0.1 to 3 millimeters. In the present embodiment, while a case where the rear surface 1b of the solar battery panel 1 is made of a back film 14 is exemplified, it is not limited thereto, and a reinforcing plate such as a glass plate or a metal plate may be provided on the rear surface 1b of the solar battery panel 1. Furthermore, while thicknesses of the plate-like protruding portions 2b are preferably made the same as or thinner than that of the side configuring the adhesive surface 21 of the cylindrical portion 2a, the thicknesses may be thicker.

Figure 9:
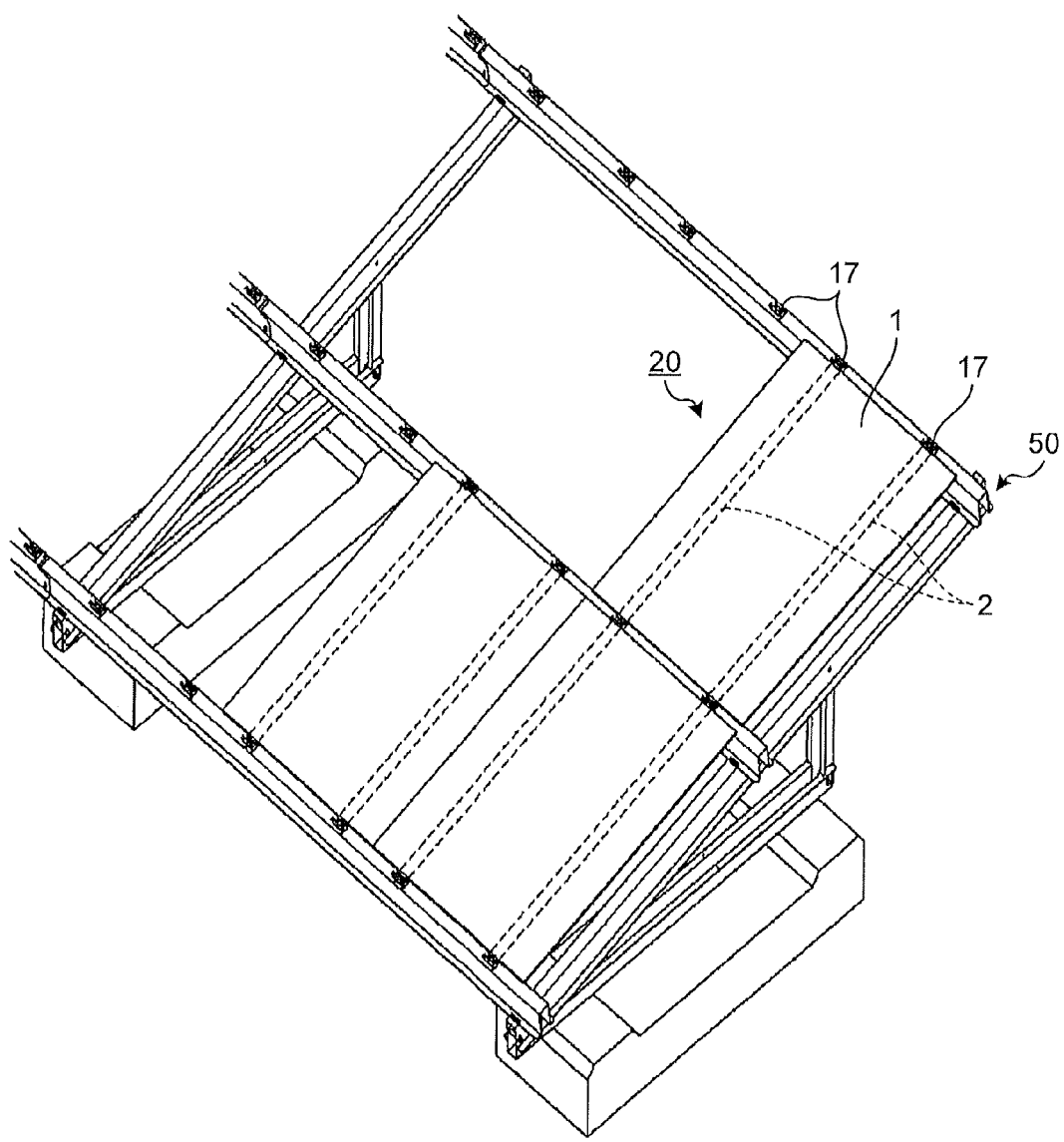
FIG. 9 is a perspective view of a solar battery module fixed on a solar battery rack.

FIG. 9 is a perspective view of the solar battery module 20 fixed on a solar battery rack. As shown in FIG. 9, the solar battery panel 1 is fixed on a solar battery rack 50 or the like installed on the ground or a roof via the reinforcing rail 2. Detailed explanations of a configuration of the solar battery rack 50 and of a configuration of fixing the reinforcing rail 2 on the solar battery rack 50 will be omitted.

Second Embodiment

Figure 5:
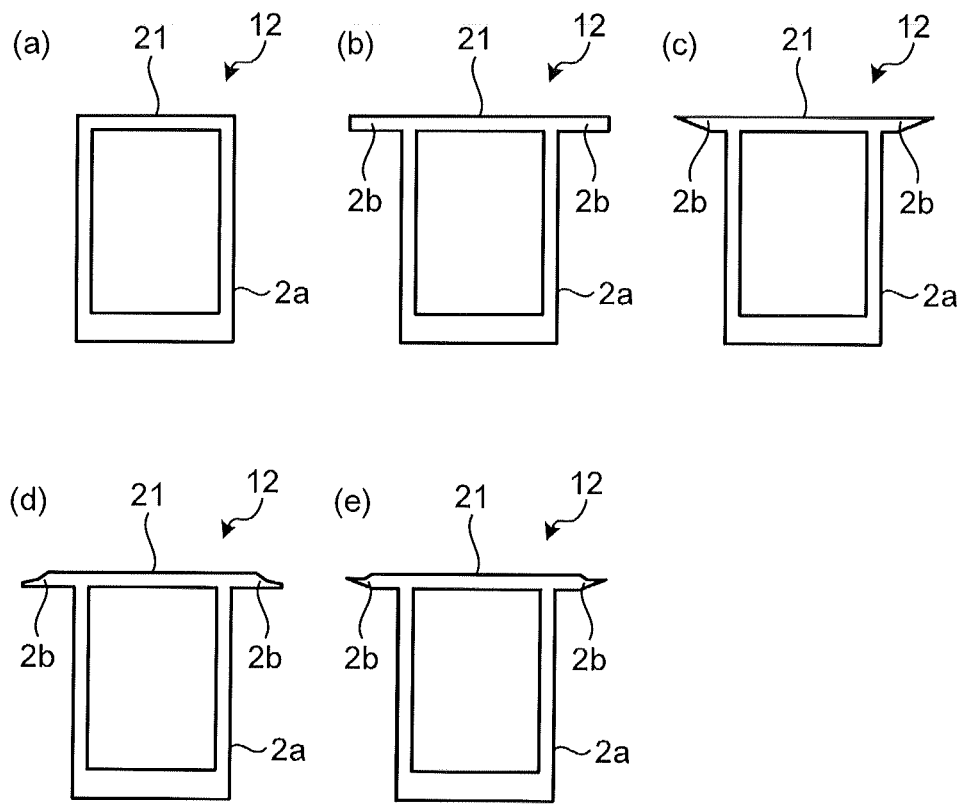
FIG. 5 are cross sectional views of a reinforcing rail used in a solar battery module according to a second embodiment of the present invention.

FIG. 5 are cross sectional views of a reinforcing rail 12 used in a solar battery module according to a second embodiment of the present invention. Configurations identical to those of the above embodiment are denoted by like reference signs and detailed explanations thereof will be omitted. The second embodiment is characterized such that among those sides configuring the cylindrical portion 2a in which the cross sectional shape is a substantially rectangular shape, a thickness of a side opposite to the side from which the adhesive surface 21 is formed is thicker than a thickness of the side from which the adhesive surface 21 is formed.

With this configuration, the flexural rigidity of the reinforcing rail 12 increases. Therefore, a deformation amount of the entire reinforcing rail 12 and the solar battery module 20 (see also FIG. 1) due to the load such as wind pressure and accumulated snow decreases. As a result, stress generated in the solar battery panel 1 (see also FIG. 1) can be reduced. Further, because the stress generated in the side from which the adhesive surface 21 of the reinforcing rail 12 is formed is small, a thickness of only a necessary portion is increased to thereby suppress an increase in the material cost.

In FIGS. 5(a) to 5(e), various variations of the reinforcing rail 12 according to the second embodiment are shown. As shown in FIGS. 5(b) to 5(e), stress may be further reduced by providing the protruding portions 2b explained in the first embodiment.

Third Embodiment

Figure 6:
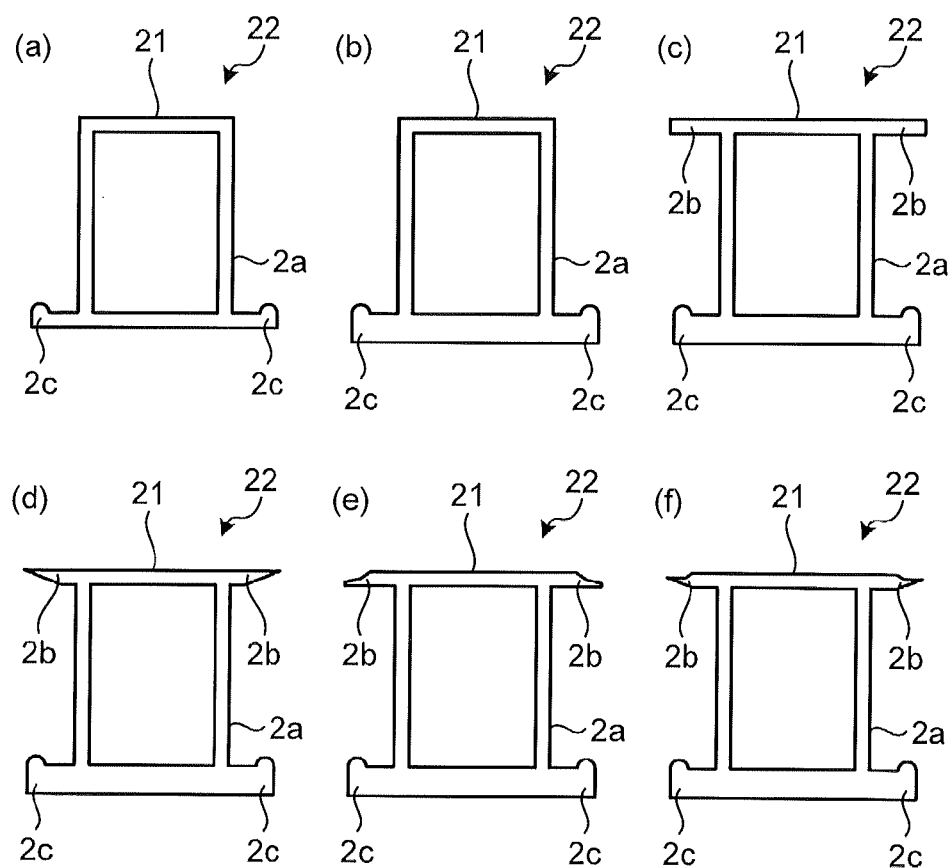
FIG. 6 are cross sectional views of a reinforcing rail used in a solar battery module according to a third embodiment of the present invention.

FIG. 6 are cross sectional views of a reinforcing rail 22 used in a solar battery module according to a third embodiment of the present invention. Configurations identical to those of the above embodiments are denoted by like reference signs and detailed explanations thereof will be omitted. The reinforcing rail 22 according to the third embodiment is characterized by including locking portions 2c.

The locking portions 2c are formed so as to protrude from the end portions along the longitudinal direction of the side opposite to the side from which the adhesive surface 21 of the cylindrical portion 2a is formed. The locking portions 2c are locked by a fixing bracket 17 (see also FIG. 9) and the solar battery module is fixed on the solar battery rack or the like, and thus an installation operation of the solar battery module can be simply performed.

In FIGS. 6(a) to 6(f), various variations of the reinforcing rail 22 according to the third embodiment are shown. As shown in FIGS. 6(b) to 6(f), the protruding portions 2b explained in the above embodiments may be provided and a certain side of the cylindrical portion 2a may be made thick.

Furthermore, a screw hole (not shown) for screwing the reinforcing rail 22 to the fixing bracket 17 may be formed in the locking portion 2c.

Fourth Embodiment

Figure 7:
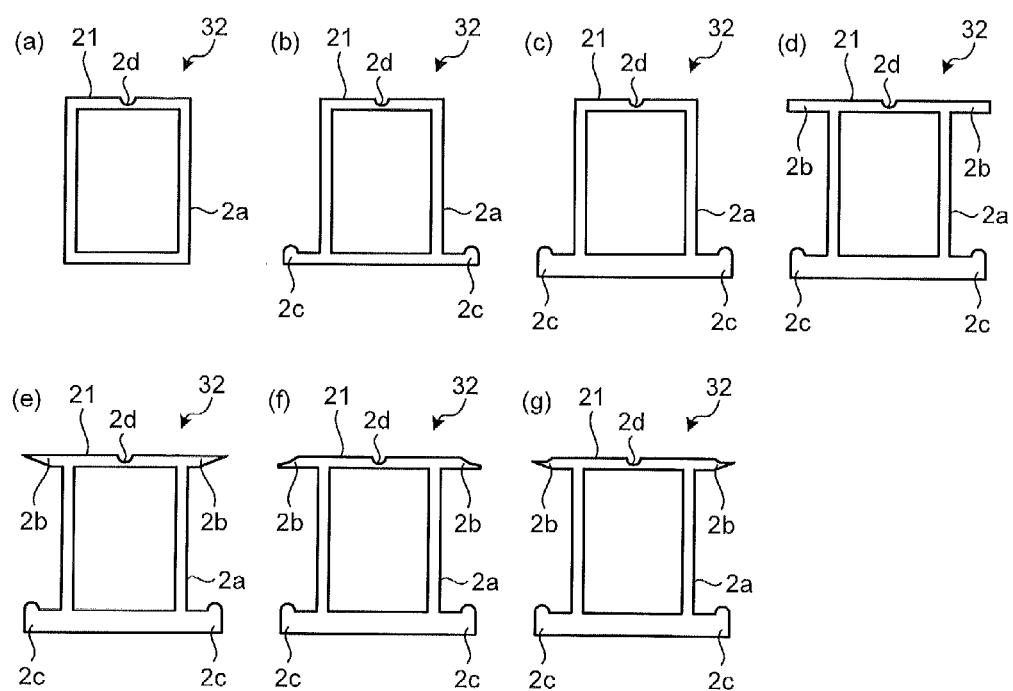
FIG. 7 are cross sectional views of a reinforcing rail used in a solar battery module according to a fourth embodiment of the present invention.

FIG. 7 are cross sectional views of a reinforcing rail 32 used in a solar battery module according to a fourth embodiment of the present invention. Configurations identical to those of the above embodiments are denoted by like reference signs and detailed explanations thereof will be omitted. The reinforcing rail 32 according to the fourth embodiment is characterized in that a groove 2d is formed along the longitudinal direction in the adhesive surface 21.

By forming the groove 2d in the adhesive surface 21, when an adhesive as the adhesive member 3 is applied to the reinforcing rail 32, the adhesive is easily applied in the form of one bead with the groove 2d used as a target, thereby improving adhesion workability.

When the adhesive is applied in a form of two beads to the adhesive surface 21 of the reinforcing rail 32, at the time of adhering the solar battery panel 1 (see also FIG. 1) and the reinforcing rail 32, the groove 2d functions as a drain for applying and spreading the adhesive, and serves to facilitate evenly applying and spreading the adhesive.

In FIGS. 7(a) to 7(g), various variations of the reinforcing rail 32 according to the fourth embodiment are shown. As shown in FIGS. 7(b) to 7(g), the protruding portions 2b and the locking portions 2c explained in the above embodiments may be provided and a certain side of the cylindrical portion 2a may be made thick.

Fifth Embodiment

Figure 8:
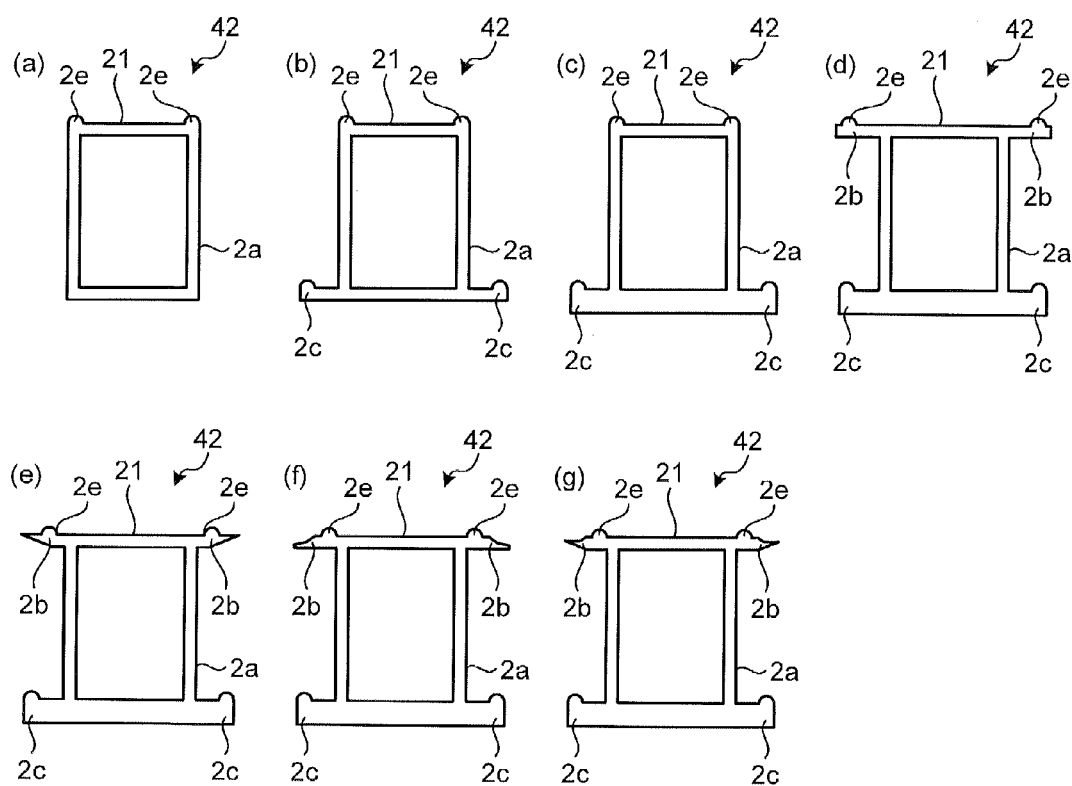
FIG. 8 are cross sectional views of a reinforcing rail used in a solar battery module according to a fifth embodiment of the present invention.

FIG. 8 are cross sectional views of a reinforcing rail 42 used in a solar battery module according to a fifth embodiment of the present invention. Configurations identical to those of the above embodiment are denoted by like reference signs and detailed explanations thereof will be omitted. The fifth embodiment is characterized in that projections 2e that protrude toward the rear surface 1b (see also FIG. 3) of the solar battery panel 1 are formed on the side of the adhesive surface 21 of the reinforcing rail 42.

The projections 2e are formed so as to extend in the longitudinal direction of the cylindrical portion 2a. By providing the projections 2e, a thickness of the adhesive can be controlled between the rear surface 1b of the solar battery panel 1 and the adhesive surface 21. Furthermore, by providing the projections 2e on both end portions along the longitudinal direction of the adhesive surface 21, the adhesive can be prevented from flowing out of the adhesive surface 21.

In FIGS. 8(a) to 8(g), various variations of the reinforcing rail 42 are shown. As shown in FIGS. 8(b) to 8(g), the protruding portions 2b and the locking portions 2c explained in the above embodiments may be provided and a certain side of the cylindrical portion 2a may be made thick. Although descriptions thereof are omitted, the groove 2d (see also FIG. 7) may be formed in the adhesive surface. Further, in a case of providing the protruding portions 2b, the projections 2e are preferably formed on the protruding portions 2b.

INDUSTRIAL APPLICABILITY

As described above, the reinforcing frame according to the present invention is useful for a reinforcing frame to be adhered to a rear surface of a solar battery panel.

REFERENCE SIGNS LIST

1 solar battery panel, 1a light receiving surface, 1b rear surface, 2, 12, 22, 32, 42 reinforcing rail (reinforcing frame), 2a cylindrical portion, 2b protruding portion, 2c locking portion, 2d groove, 2e projection, 3 adhesive member, 11 solar battery cell, 13 translucent panel, 14 back film, 15 sealing material, 17 fixing bracket, 20 solar battery module, 21 adhesive surface, 50 solar battery rack.

The invention claimed is:

1. A solar battery module, comprising:
  a solar battery panel;
  a reinforcing rail adhered to a non-light receiving surface of the solar battery panel, wherein the reinforcing rail includes:
    a beam having a hollow rectangular cross-section perpendicular to a longitudinal direction of the beam;
    an adhesive surface adhered to the non-light receiving surface of the solar battery panel; and
    protruding portions that protrude from end portions of the beam along the longitudinal direction of the adhesive surface and that are substantially parallel to the adhesive surface, wherein
    the protruding portions each have a portion having a constant thickness and extending from the constant thickness portion to respective terminal ends of the protruding portions, portions having a smaller thickness as the smaller thickness portions become more separated from the end portions of the beam, and as the smaller thickness portions of the protruding portions become more separated from the end portions of the beam, upper surfaces, which are surfaces proximate the solar battery panel, become more separated from the non-light receiving surface of the solar battery panel, the upper surfaces of the smaller thickness portions meet respective lower surfaces of the protruding portions at points of the terminal ends of the respective protruding portions; and
  an adhesive layer is formed between the adhesive surface of the beam and the non-light receiving surface of the solar battery panel, a portion of the adhesive layer formed over the smaller thickness portions from a terminal end of the protruding portions to the constant thickness portion being thicker than a portion of the adhesive layer between smaller thickness portions of the protruding portions.

2. The solar battery module according to claim 1, wherein as the protruding portions become more separated from the beam, the lower surfaces, which are surfaces configured to be opposite to a side of the solar battery panel, are configured to become closer to a rear surface of the solar battery panel.

3. The solar battery module according to claim 1, wherein the reinforcing rail further comprises locking portions that protrude from the terminal end portions along a longitudinal direction of a side opposite to a side from which the adhesive surface is formed and that are locked on a fixing bracket for fixing the solar battery panel, and in which a screw hole for screwing the solar battery panel to the fixing bracket is formed.

4. The solar battery module according to claim 1, wherein in the adhesive surface, a groove is formed along the longitudinal direction of the beam.

5. The solar battery module according to claim 1, further comprising projections that are formed on the adhesive surface and extend along the longitudinal direction of the beam and that protrude to the rear surface of the solar battery panel.

6. The solar battery module according to claim 5, wherein the projections are formed on both end portions along the longitudinal direction of the adhesive surface.

* * * * *